(12) United States Patent
Yeh et al.

(10) Patent No.: US 9,860,433 B2
(45) Date of Patent: Jan. 2, 2018

(54) ELECTRONIC DEVICE AND IMAGE BUILDING MODULE THEREOF

(71) Applicant: PEGATRON CORPORATION, Taipei (TW)

(72) Inventors: Tsung-Chih Yeh, Taipei (TW); Tung-Liang Wang, Taipei (TW); Pi-Min Kao, Taipei (TW); Hsun-Hsin Lee, Taipei (TW); Chun-Hao Kuo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 272 days.

(21) Appl. No.: 14/956,407

(22) Filed: Dec. 2, 2015

(65) Prior Publication Data

US 2016/0191769 A1 Jun. 30, 2016

(30) Foreign Application Priority Data

Dec. 26, 2014 (TW) .............................. 103145773 A

(51) Int. Cl.
*H04N 5/225* (2006.01)
*G06F 1/16* (2006.01)
*H04N 13/02* (2006.01)
*H01Q 1/52* (2006.01)

(52) U.S. Cl.
CPC ......... *H04N 5/2254* (2013.01); *G06F 1/1686* (2013.01); *H04N 5/2251* (2013.01); *H04N 5/2257* (2013.01); *H01Q 1/52* (2013.01); *H04N 13/0239* (2013.01)

(58) Field of Classification Search
CPC .. H04N 5/2254; H04N 5/2251; H04N 5/2257; G06F 1/1686
See application file for complete search history.

(56) References Cited

FOREIGN PATENT DOCUMENTS

| CN | 103221896 A | 7/2013 |
|---|---|---|
| TW | M385021 U | 7/2010 |
| TW | 201309001 A | 2/2013 |
| TW | M472336 U | 2/2014 |

*Primary Examiner* — Nam Pham
(74) *Attorney, Agent, or Firm* — CKC & Partners Co., Ltd.

(57) ABSTRACT

An image building module includes an image builder, a signal-shielding flexible film, and a signal shielding cover. The image builder includes a first image capturing element and a processing chip. The first image capturing element is used for capturing a first image. The processing chip is used for processing the first image. The signal-shielding flexible film covers the processing chip. The signal shielding cover covers the image builder and the signal-shielding flexible film. The signal shielding cover has a first through hole exposing the first image capturing element.

20 Claims, 9 Drawing Sheets

ELECTRONIC DEVICE AND IMAGE BUILDING MODULE THEREOF

CROSS-REFERENCE TO RELATED APPLICATIONS

This Non-provisional application claims priority under 35 U.S.C. §119(a) on Patent Application No(s). 103145773 filed in Taiwan, Republic of China on Dec. 26, 2014, the entire contents of which are hereby incorporated by reference.

BACKGROUND

Technology Field

This disclosure relates to an image building module.

Description of the Related Art

Generally speaking, at present, many electronic devices such as notebook computers, all-in-one PCs, tablet computers and so on are provided with front lenses to allow users to capture images or to make films. The electronic devices also include antenna modules wirelessly connected with Internet, thus allowing the users to browse the Internet and to upload the images or films to the Internet as well.

With the development of the multimedia technology, stereoscopic images attract more and more attention. Further, at present, parts of the electronic devices use image building modules to build stereoscopic images according to the images captured by the front lenses. In detail, the image building, module uses two front lenses to capture different flat images, respectively and thus uses a processing chip to composite the two flat images to build the stereoscopic image.

However, when the image building module operates, it easily interferes with signals of the antenna thus to increase the noise of the antenna.

SUMMARY

Accordingly, one objective of the invention is to prevent the image building module from interfering with the signals of the antenna thus to reduce the noise of the antenna.

To achieve the objective, according to one aspect of the invention, an image building module includes an image builder, a signal-shielding flexible film, and a signal shielding cover. The image builder includes a first image capturing, element and a processing chip. The first image capturing element is used for capturing a first image. The processing chip is used for processing the first image. The signal-shielding flexible film covers the processing chip. The signal shielding cover covers the image builder and the signal-shielding flexible film. The signal shielding cover has a first through hole exposing the first image capturing element.

According to another aspect of the invention, an electronic device includes a substrate, at least one antenna, and an image building module. The antenna and the image building module are disposed at the substrate. The image building module includes an image builder, a signal-shielding flexible film, and a signal shielding cover. The image builder includes a first image capturing, element and a processing chip. The first image capturing element is used for capturing a first image. The processing chip is used for processing the first image. The signal-shielding flexible film covers the processing chip. The signal shielding cover covers the image builder and the signal-shielding flexible film. The signal shielding cover has a first through hole exposing the first image capturing element.

To sum up, since the signal-shielding flexible film covers the processing chip, interference on the signals of the antenna can be reduced when the processing chip operates. In addition, since the signal shielding cover covers the image builder, interference on the signals of the antenna can be further reduced when the image builder operates. Accordingly, the invention can prevent the image building module from interfering with the signals of the antenna to reduce the noise of the antenna.

The above description is only used for describing the problem to be solved by the invention, the technical means to solve the problem, and the produced result. The specific details of the invention may be described in the following detailed description with reference to accompanying drawings.

BRIEF DESCRIPTION OF THE DRAWINGS

These and other features, aspects, and advantages of the present invention will become better understood with regard to the following description, appended claims, and accompanying drawings:

DETAILED DESCRIPTION

Figure 1:
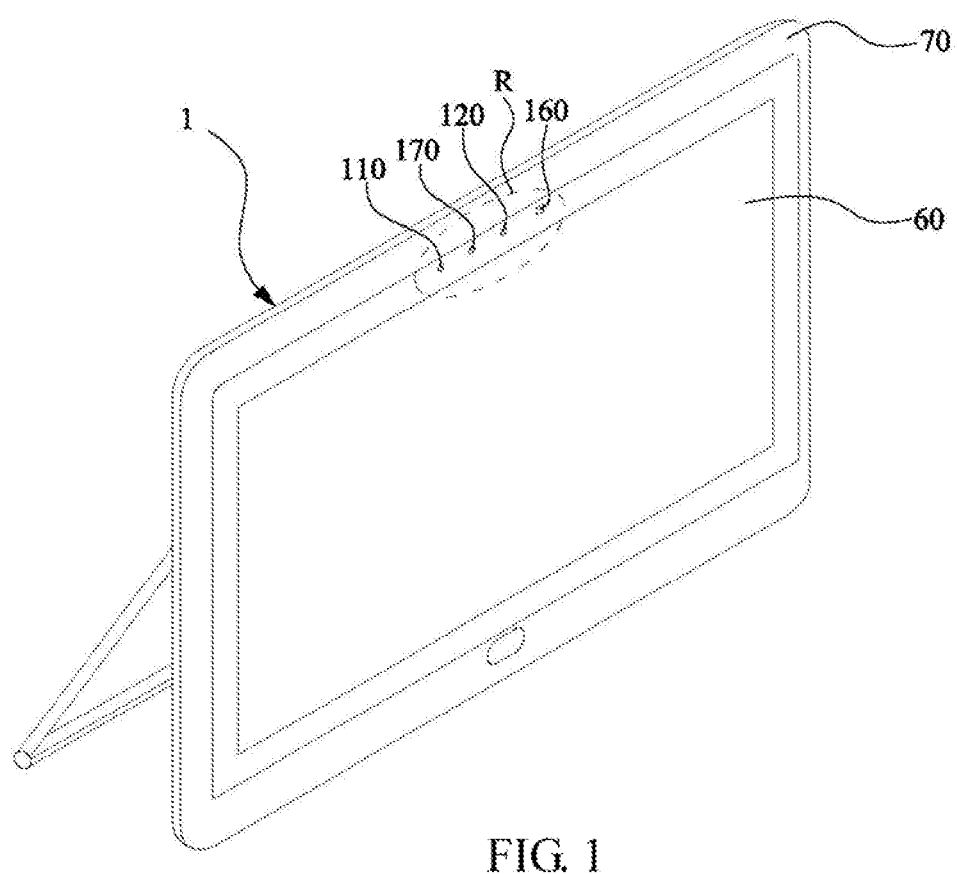
FIG. 1 is a three-dimensional diagram of an electronic device according to one embodiment of the invention.

The following drawings disclose several embodiments of the present invention, and for clear illustration, many details of the practice may be described in the following description. However, persons in the art should understand that the practical details are not essential in some embodiments and therefore they are not used to limit the present invention. In addition, to simplify the drawings, some conventional structures and elements in the drawings may be depicted in a simple method. Further, to facilitate reading, each element in the drawings is not depicted in the original dimension.

Figure 2:
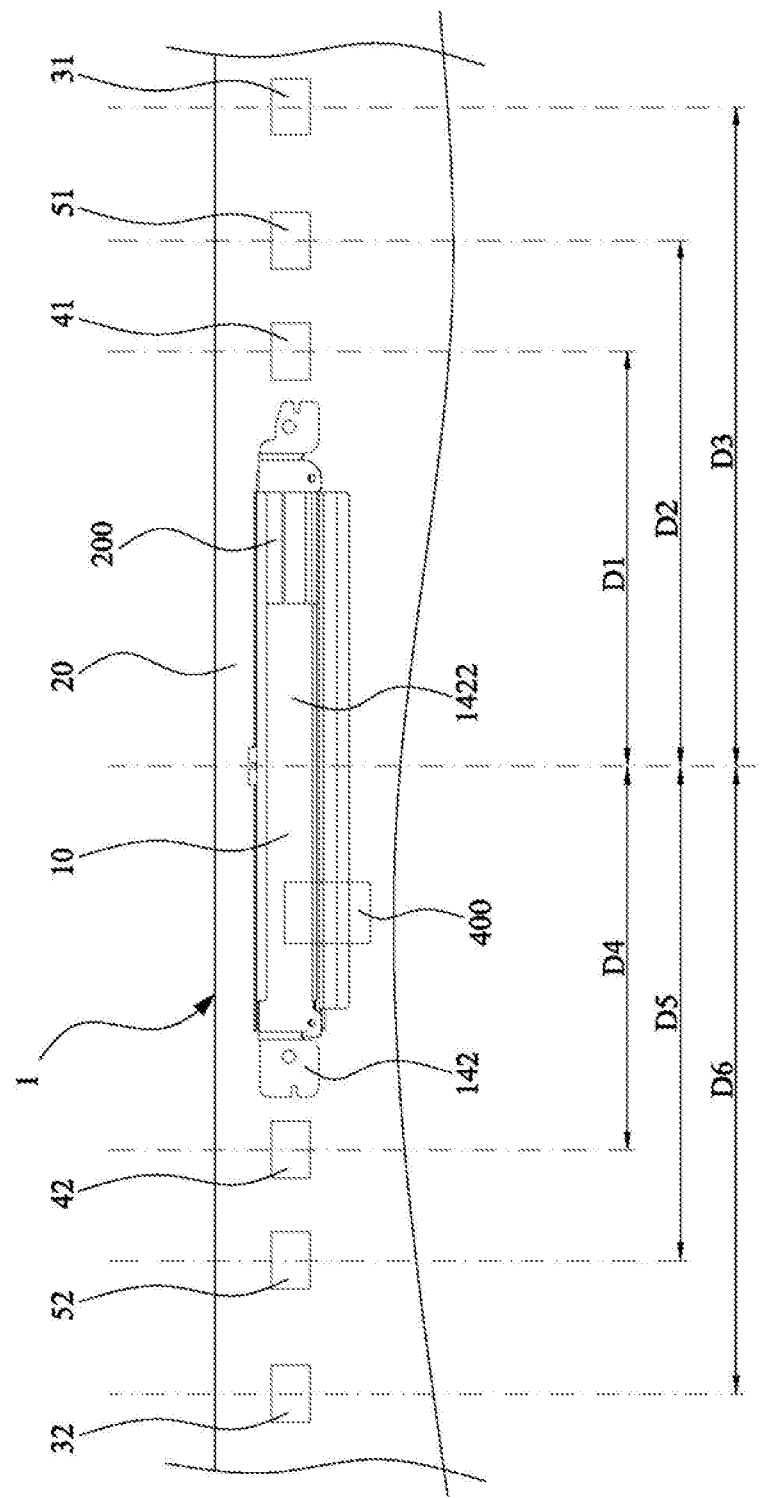
FIG. 2 is a top view of the interior of a local area of the electronic device in FIG. 1.
Figure 3:
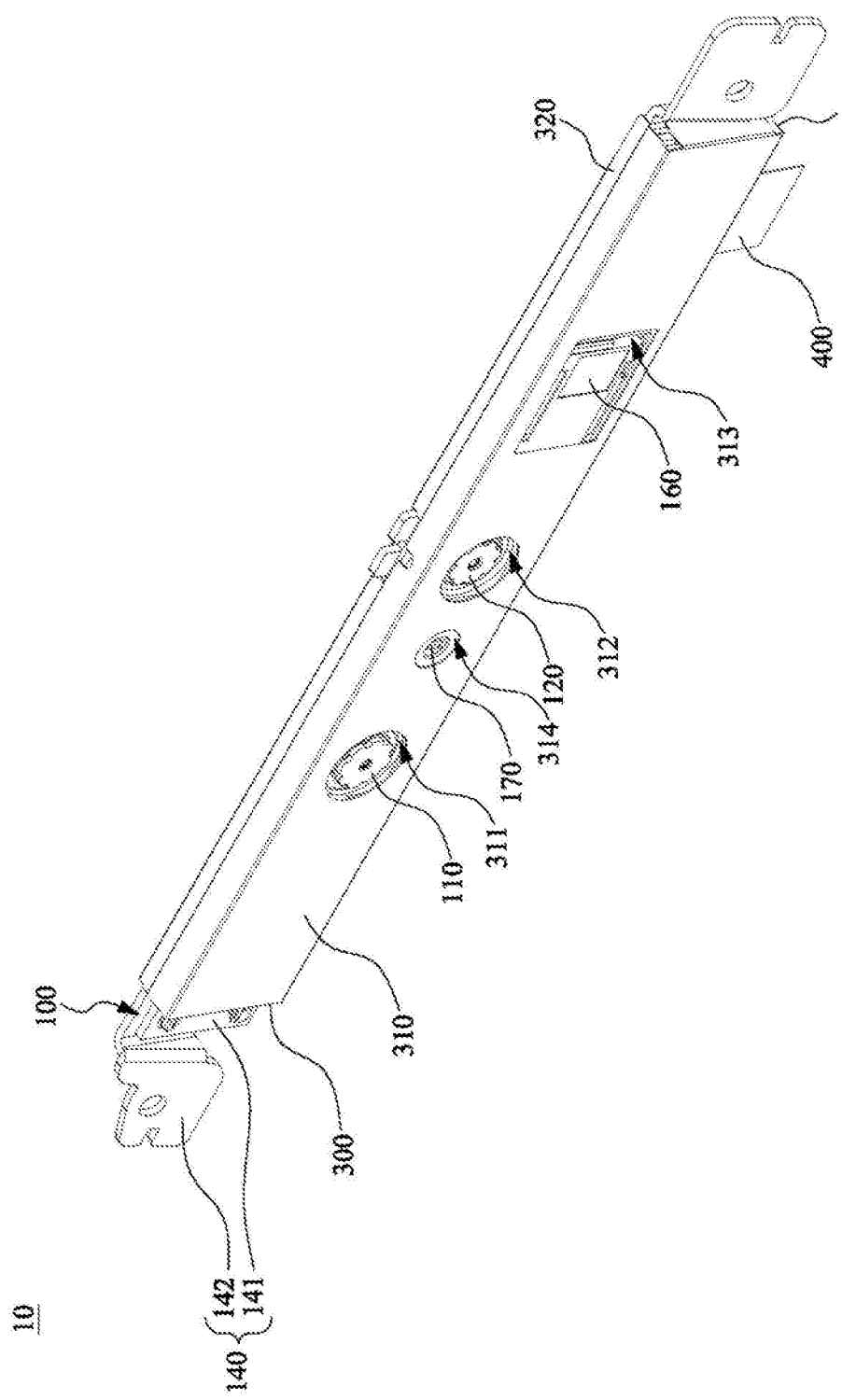
FIG. 3 is a three-dimensional diagram of an image building module according to one embodiment of the invention.
Figure 4:
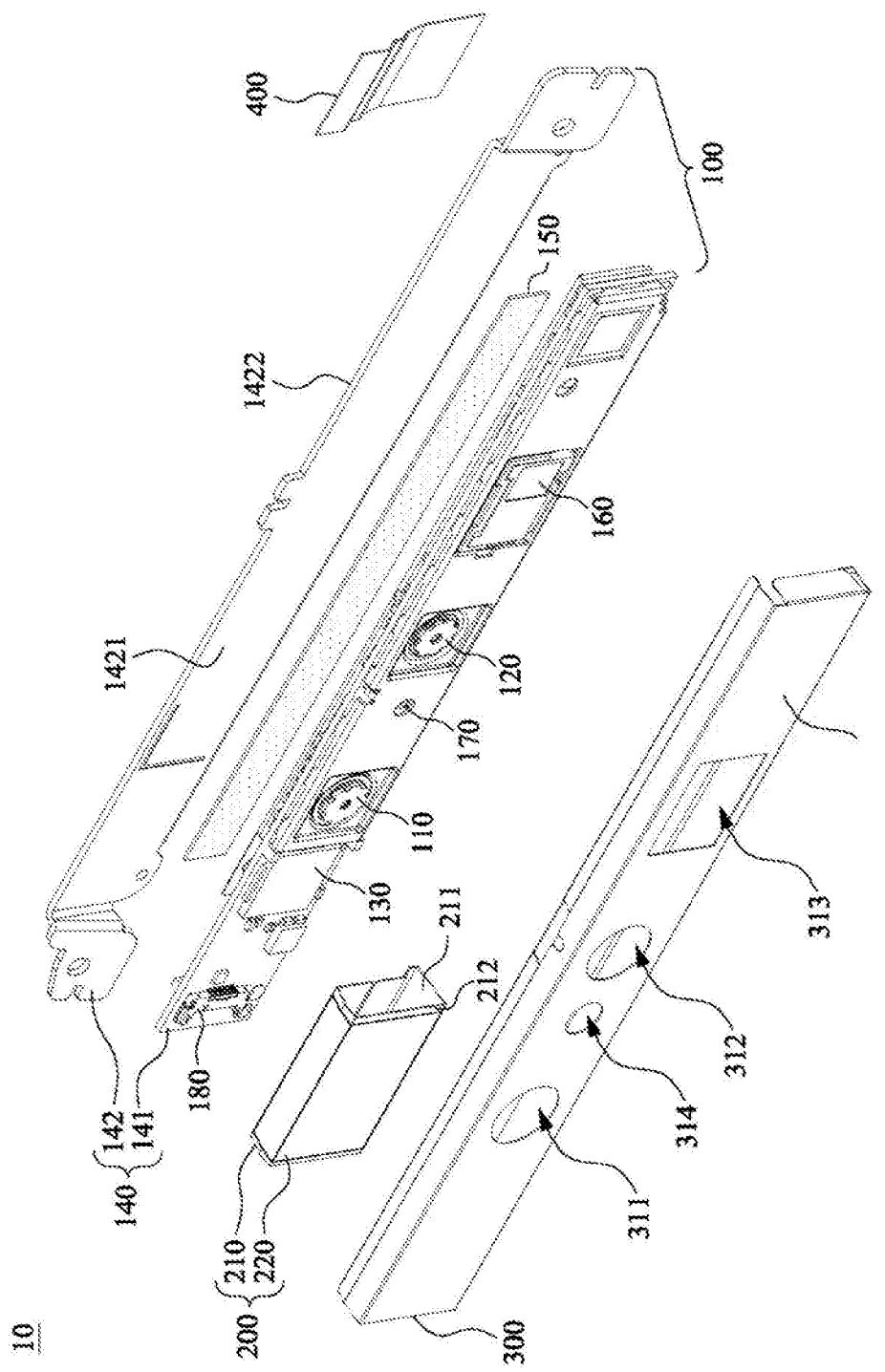
FIG. 4 is a three-dimensional exploded diagram of the image building module in FIG. 3.

FIG. 1 is a three-dimensional diagram of an electronic device according to one embodiment of the invention. FIG. 2 is a top view of the interior of a local area of the electronic device in FIG. 1. In FIG. 2, the electronic device 1 includes an image building module 10, a substrate 20, and an antenna 31. The image building module 10 may be a camera module including an image capturing element (such as a CCD or a CMOS) and a processing chip. The image capturing element can capture images via a light sensing method. In detail, when the image capturing element receives ambient light, it can generate an electric signal corresponding to the intensity of the light, and thus the processing chip can build images according to the electric signal generated by the image capturing element. The image building module 10 and the antenna 31 are disposed at the substrate 20. When the image building module 10 operates, the noise of the antenna 31 easily increases. Accordingly, the invention proposes the following technical means to reduce the noise of the antenna 31. Further, please refer to FIG. 3 and FIG. 4. FIG. 3 is a three-dimensional diagram of an image building module 10 according to one embodiment of the invention, and FIG. 4 is a three-dimensional exploded diagram of the image building module 10 in FIG. 3. In FIG. 3 and FIG. 4, the image building module 10 includes an image builder 100. The image builder 100 includes a first image capturing element 110 and a processing chip 130. The first image capturing element 110 is used for capturing a first image. The processing chip 130 is electrically connected with the first image capturing element 110 to obtain the first image from the first image capturing element 110 and thus to process the first image.

Further, in some embodiments, the image building module 10 can build a stereoscopic image. In detail, the image builder 100 further includes a second image capturing element 120. The first image capturing element 110 and the second image capturing element 120 are separated from each other thus to capture the first image and the second image from different perspectives. The processing chip 130 is electrically connected with the first image capturing element 110 and the second image capturing element 120 to obtain the first image and the second image from the first image capturing element 110 and the second image capturing element 120, respectively, and thus to build the stereoscopic image according to the first image and the second image.

Inventors of the invention find that the frequency range of signals of the processing chip 130 at least overlaps that of signals of the antenna 31 when the processing chip 130 operates (especially in the process of building the stereoscopic image or transmitting the built stereoscopic image to the outside of the image building module 10) and therefore the signals of the processing chip 130 interferes with that of the antenna 31 thus to increase the noise of the antenna 31. For example, when the signals of the processing chip 130 conform to USB Revision 3.0 Specification, the easily interfere with the signals of the antenna 31 thus to increase the noise of the antenna 31. Accordingly, in one embodiment of the invention, FIG. 4, the image building module 10 includes a signal-shielding flexible film 200 and a signal shielding cover 300. The signal-shielding flexible film 200 covers and contacts the processing chip 130. Since the signal-shielding flexible film 200 is flexible, it can bend along the surface of the processing chip 130 thus to smoothly cover and contact the entire surface of the processing chip 130. Accordingly, the signal-shielding flexible film 200 can effectively shield the signals of the processing chip 130 to prevent the signals of the processing chip 130 from effecting the antenna 31 (in FIG. 2) further to reduce the noise of the antenna 31. The signal shielding cover 300 covers the image builder 100 and the signal-shielding flexible film 200 to shield signals of other elements of the image builder 100 further to reduce the noise of the antenna 31. According to the above embodiment, the signal-shielding flexible film 200 and the signal shielding cover 300 can prevent the image building module 10 from interfering with the signals of the antenna 31 thus to reduce the noise of the antenna 31.

Figure 5:
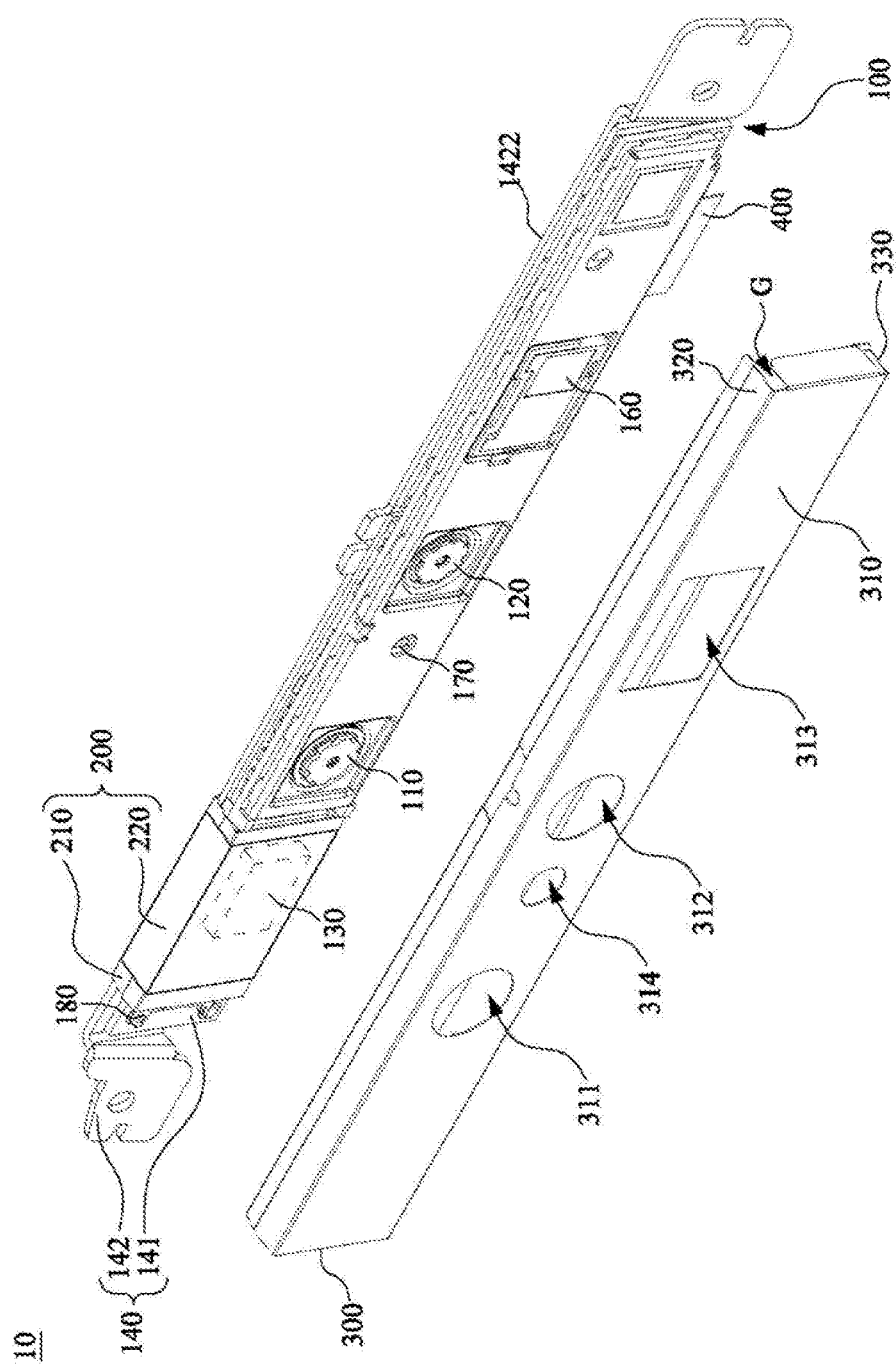
FIG. 5 is a three-dimensional diagram showing that a signal shielding cover is disassembled from an image builder in FIG. 3.

FIG. 5 is a three-dimensional diagram showing that the signal shielding cover 300 is disassembled from the image builder 100 in FIG. 3. In FIG. 5, the image builder 100 includes a base 140. The first image capturing element 110, the second image capturing element 120, and the processing chip 130 are disposed at the base 140. The signal-shielding flexible film 200 surrounds the processing chip 130 and the base 140. In other words, the signal-shielding flexible film 200 surrounds and tightly contacts the processing chip 130 and the base 140 to narrow the gap between the signal-shielding flexible film 200 and the processing chip 130 further to prevent the signals of the processing chip 130 from interfering with the signals of the antenna 31 (in FIG. 2).

In some embodiments, the signal-shielding flexible film 200 can be adhered to the processing chip 130 thus to tightly contact the processing chip 130 to help shielding the signals. In detail, in FIG. 4, the signal-shielding flexible film 200 includes an adhesive film 210 and a metal foil 220. The adhesive film 210 has a first surface 211 and a second surface 212. The first surface 211 and the second surface 212 are back to back. The first surface 211 surrounds the processing chip 130 and the base 140 and is adhered to the processing chip 130 and the base 140. The metal foil 220 is disposed at the second surface 212. Accordingly, the signal-shielding flexible film 200 can tightly contact the processing chip 130 and the base 140, and the metal foil 220 can shield the signals.

In some embodiments, in FIG. 5, the signal shielding cover 300 can include a clamping groove G. The image builder 100 can be clamped in the clamping groove G thus to present the state in FIG. 3. Accordingly, the signal shielding cover 300 can cover different sides of the image builder 100 thus to prevent signals of the image builder 100 from interfering with the signals of the antenna 31 (in FIG. 2).

In detail, in FIG. 5, the signal shielding cover 300 includes a connecting plate 310 and two side plates 320, 330 opposite to each other. The connecting plate 310 is connected between the two side plates 320, 330. The connecting plate 310 and the two side plates 320, 330 define the clamping groove G. When the image builder 100 is clamped in the clamping groove the connecting plate 310 and the two side plates 320, 330 can cover different sides of the image builder 100, respectively. For example, the connecting plate 310 can cover the front side of the image builder 100; the side plate 320 can cover the upper side of the image builder 100; the side plate 330 can cover the lower side of the image builder 100. Accordingly, the signal shielding cover 300 can prevent the signals of the image builder 100 from interfering with the signals of the antenna 31 (in FIG. 2). In some embodiments, when the image builder 100 is clamped in the clamping groove G, the connecting plate 310 can cover the signal-shielding flexible film 200 and the processing chip 130 thus to prevent the signals of the processing chip 130 from interfering with the signals of the antenna 31.

In some embodiments, in FIG. 5, the signal shielding cover 300 has a first through hole 311 and a second through hole 312. The first through hole 311 and the second through hole 312 are disposed at the connecting plate 310 and are aligned with the first image capturing element 110 and the second image capturing element 120, respectively. Accordingly, when the image builder 100 is clamped in the clamping groove G, although the connecting plate 310 covers the front side of the image builder 100, the first through hole 311 and the second through hole 312 disposed at the connecting plate 310 can expose the first image capturing element 110 and the second image capturing element 120, respectively, thus facilitating capturing the first image and the second image.

In some embodiments, in FIG. 4, the base 140 can include a circuit board module 141 and a metal back plate 142. The processing chip 130 is disposed at the circuit board module 141, and the circuit board module 141 is disposed between the processing chip 130 and the metal back plate 142. The metal back plate 142 has an inner surface 1421 and an outer surface 1422. The inner surface 1421 and the outer surface 1422 are opposite to each other. The inner surface 1421 is adhered to the circuit board module 141. For example, the image builder 100 can include an adhesive layer 150, and the adhesive layer 150 can be adhered between the circuit board module 141 and the inner surface 1421 of the metal back plate 142 to fasten the circuit board module 141 and the metal back plate 142. When the processing chip 130 operates, the generated heat can be conducted to the metal back plate 142 via the circuit board module 141 and the adhesive layer 150 in sequence. Due to the high thermal conductivity of the material, the metal back plate 142 can conduct the heat to the substrate 20 rapidly (in FIG. 2) to dissipate the heat of the image builder 100. In some embodiments, the signal-shielding flexible film 200 can surround the processing chip 130 and the metal back plate 142. Further, the first surface 211 of the adhesive film 210 of the signal-shielding flexible film 200 can surround and be adhered to the processing chip 130 and the outer surface 1422 of the metal back plate 142.

Figure 6:
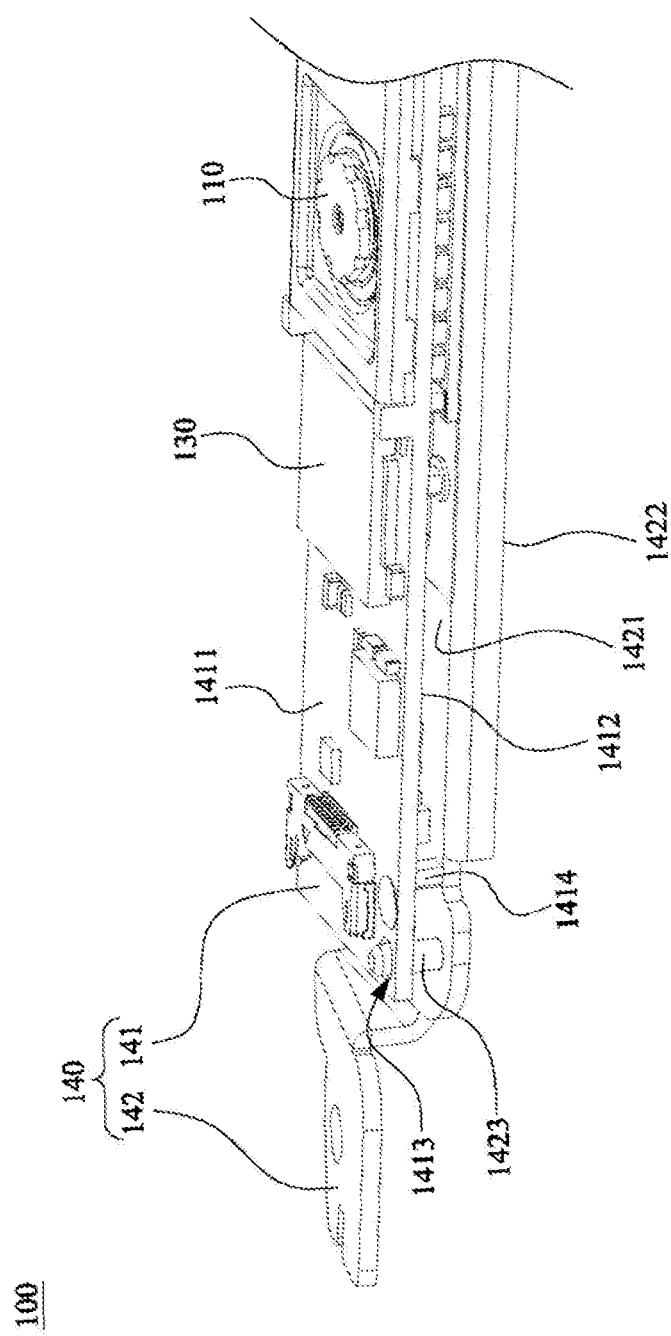
FIG. 6 is a partial three-dimensional diagram of an image builder according to one embodiment of the invention.

FIG. 6 is a partial three-dimensional diagram of the image builder 100 according to one embodiment of the invention. In FIG. 6, in some embodiments, the circuit board module 141 has a front surface 1411 and a back surface 1412. The front surface 1411 and the back surface 1412 are opposite to each other. The back surface 1412 of the circuit board module 141 faces the inner surface 1421 of the metal back plate 142, and they can be adhered to each other (such as via the adhesive layer 150 in FIG. 4). The circuit board module 141 can include a first positioning structure 1413. The metal back plate 142 can include a second positioning structure 1423. The second positioning structure 1423 is disposed at the inner surface 1421 of the metal back plate 142. The first positioning structure 1413 and the second positioning structure 1423 can be combined with each other in a pluggable method thus to limit the positions of the circuit board module 141 and the metal back plate 142. For example, the first positioning structure 1413 can be a positioning hole passing through the front surface 1411 and the back surface 1412 of the circuit board module 141. The second positioning structure 1423 can be a positioning column protruding from the inner surface 1421 of the metal back plate 142. The second positioning structure 1423 (positioning column) can be inserted and pass through the first positioning structure 1413 (positioning hole) thus to achieve the limitation effect.

In some embodiments, in FIG. 6, the circuit board module 141 has a grounding portion 1414. The grounding portion 1414 can contact the inner surface 1421 of the metal back plate 142 to achieve electrostatic protection. In detail, the grounding portion 1414 can be a conductive protruding block protruding from the back surface 1412 of the circuit hoard module 141 and contacting the inner surface 1421 of the metal back plate 142, and therefore the grounding portion 1414 can be electrically connected with the metal back plate 142 to achieve electrostatic protection for the circuit board module 141 and electronic elements thereon (such as the first image capturing element 110 or the processing chip 130).

Figure 7:
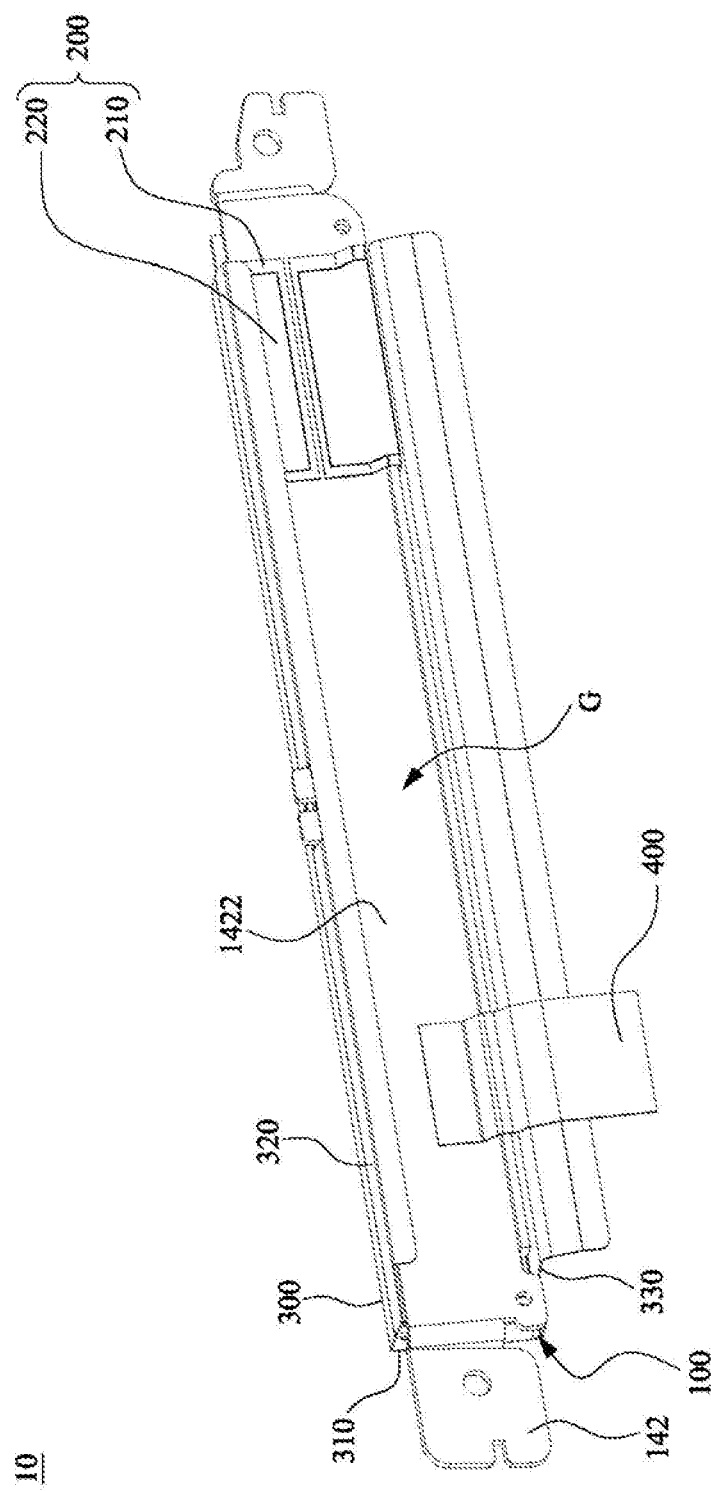
FIG. 7 is a back three-dimensional diagram of an image building module according to one embodiment of the invention.

FIG. 7 is a back three-dimensional diagram of the image building module 10 according to one embodiment of the invention. In FIG. 7, in some embodiments, the image building module 10 can include a grounding foil 400. One part of the grounding foil 400 is disposed at and adhered to the outer surface 1422 of the metal back plate 142, and the other part of the grounding foil 400 is separated from the image builder 100 and the signal shielding cover 300 and is adhered to the substrate 20 (in FIG. 2). The material of the grounding foil 400 and the substrate 20 can be metal. Accordingly, the grounding foil 400 can be electrically connected with the metal back plate 142 and the substrate 20 to ground the metal back plate 142 to achieve electrostatic protection. Further, since the grounding foil 400 contacts the metal back plate 142 and the substrate 20, heat of the metal back plate 142 can be conducted to the substrate 20 thus to improve heat dissipation.

Figure 8:
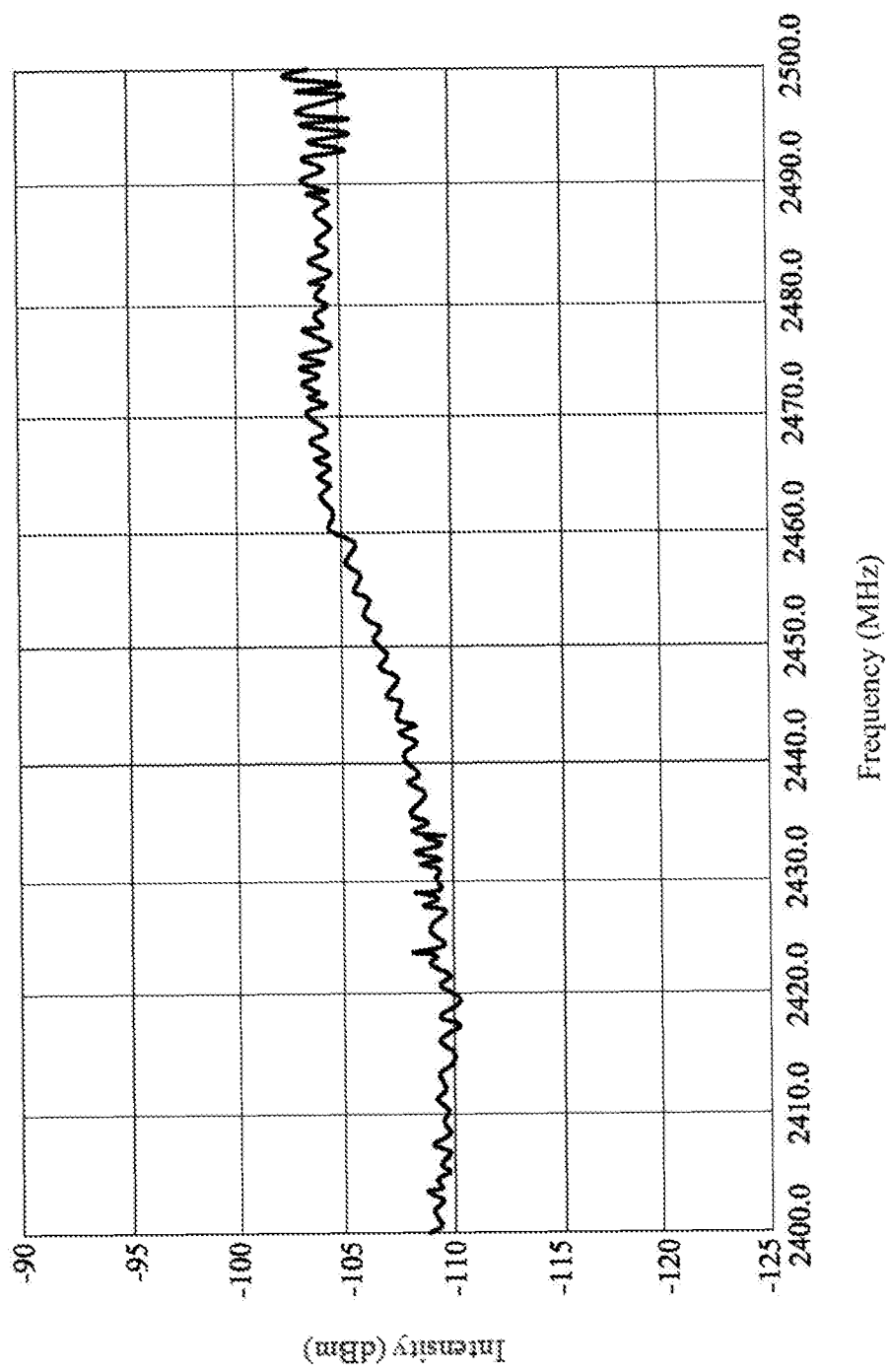
FIG. 8 is a signal spectrogram of an antenna when an image building nodule does not have a signal-shielding flexible film and a signal shielding cover.
Figure 9:
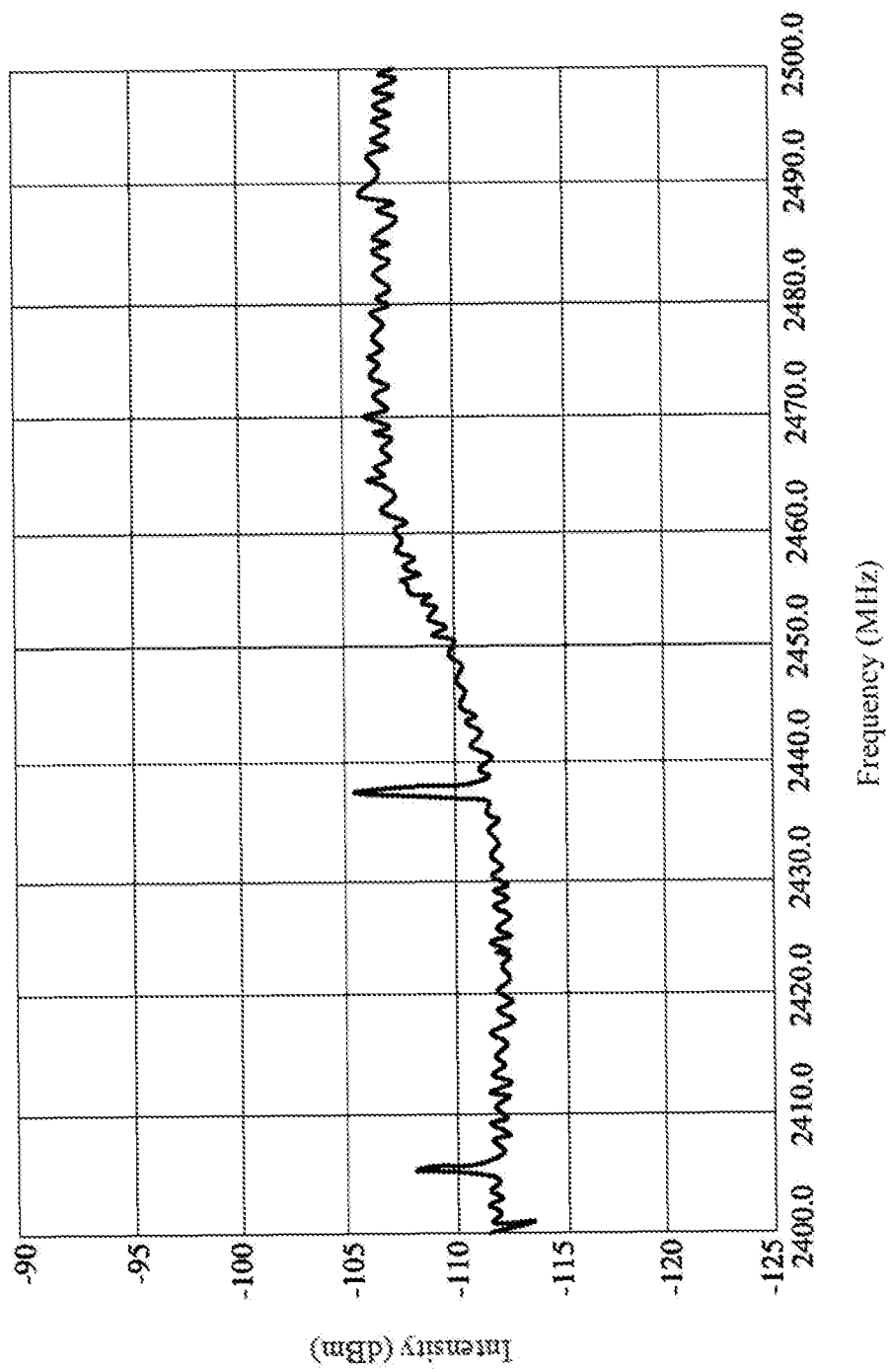
FIG. 9 is a signal spectrogram of the antenna when the image building module has the signal-shielding flexible film and the signal shielding cover.

FIG. 8 is a signal spectrogram of the antenna 31 when the image building module 10 does not have the signal-shielding flexible film 200 and the signal shielding cover 300. FIG. 9 is a signal spectrogram of the antenna 31 when the image building module 10 has the signal-shielding flexible film 200 and the signal shielding cover 300. In FIG. 8, when the image building module 10 does not have the signal-shielding flexible film 200 and the signal shielding cover 300, the signal intensity within part of the frequency range of the antenna 31 exceeds −105 dBm which does not conform to the required standard of the antenna 31 thus to greatly increase the noise. When the image building module 10 has the signal-shielding flexible film 200 and the signal shielding cover 300, the signal intensity of the antenna 31 at different frequency is less than −105 dBm which conforms to the required standard of the antenna 31 thus to effectively limit the noise within the tolerable range. Accordingly, the signal-shielding flexible film 200 and the signal shielding cover 300 can really reduce the noise of the antenna 31.

Please refer to FIG. 2 again. In some embodiments, the electronic device 1 can include a first conductive structure 41. The first conductive structure 41 is disposed at the substrate 20 and is between the antenna 31 and the image building module 10 further to shield the signals of the image building module 10 to reduce the noise of the antenna 31. In addition, the electronic device 1 can also include a second conductive structure 51. The second conductive structure 51 is disposed at the substrate 20 and is between the first conductive structure 41 and the antenna 31 further to reduce the noise of the antenna 31. In some embodiments, the centers of the image building module 10 and the first conductive structure 41 are spaced at intervals of D1, and the centers of the image building module 10 and the second conductive structure 51 are spaced at intervals of D2. The ratio of D1 to D2 is preferably 1 to 2.1. In addition, the centers of the image building module 10 and the antenna 31 are spaced at intervals of D1 The ratio of D1 to D3 is preferably 1 to 2.95. The image building module 10, the first conductive structure 41, the second conductive structure 51, and the antenna 31 provided according to the aforementioned ratios can effectively reduce the noise of the antenna 31.

In some embodiments, in FIG. 2, the electronic device 1 can include an antenna 32. The antenna 32 is disposed at the substrate 20, and the antenna 32 and the antenna 31 are symmetrically disposed at two opposite sides of the image building module 10, and the antenna 32 is more far away from the signal-shielding flexible film 200 and the covered processing chip 130 (in FIG. 4) compared to the antenna 31. Accordingly, the antenna 32 is less interfered with by the signals of the processing chip 130 compared to the antenna 31. However, to ensure that the noise of the antenna 32 conforms to the standard, the electronic device 1 can include a third conductive structure 42 and a fourth conductive structure 52. The third conductive structure 42 is disposed at the substrate 20 and is between the antenna 32 and the image building module 10. The fourth conductive structure 52 is disposed at the substrate 20 and is between the antenna 32 and the third conductive structure 42. The third conductive structure 42 and the fourth conductive structure 52 can prevent the signals of the image building module 10 from interfering with the signals of the antenna 32. In some embodiments, the centers of the image building module 10 and the third conductive structure 42 are spaced at intervals of D4, and the centers of the image building module 10 and the fourth conductive structure 52 are spaced at intervals of D5. The ratio of D4 to D5 is preferably 1 to 2.1. In addition, the centers of the image building module 10 and the antenna 32 are spaced at intervals of D6. The ratio of D1 to D6 is preferably 1 to 2.95. The image building module 10, the third conductive structure 42, the fourth conductive structure 52, and the antenna 32 provided according to the aforementioned ratios can effectively reduce the noise of the antenna 32.

In some embodiments, in FIG. 4, the image builder 100 can include an infrared ray sensor 160, an auxiliary light source 170, and a connector 180 all of which are disposed at the circuit board module 141. The infrared ray sensor 160 is used for sensing the depth of a captured object and is electrically connected with the processing chip 130. The processing chip 130 can precisely build the stereoscopic image according to the depth of the captured object sensed by the infrared ray sensor 160. The auxiliary light source 170 can light in capturing the object thus to remind the user that the object is captured at present. The connector 180 is electrically connected with the processing chip 130 thus to transmit the stereoscopic image built by the processing chip 130 to other electric elements (such as a central processing unit) of the electronic device 1 (in FIG. 1).

In some embodiments, in FIG. 4, the signal shielding cover 300 can have a third through hole 313 and a fourth through hole 314. The third through hole 313 and the fourth through hole 314 are disposed at the connecting plate 310 and are aligned with the infrared ray sensor 160 and the auxiliary light source 170, respectively. Accordingly, when the image builder 100 is disposed in the signal shielding cover 300, the third through hole 313 can expose the infrared ray sensor 160, and the fourth through hole 314 can expose the auxiliary light source 170.

In some embodiments, in FIG. 1, the electronic device 1 can include a display panel 60 and a casing 70. The display panel 60 is disposed outside of the casing 70 to display information (such as the stereoscopic image built by the image building module 10 inside the casing 70) to the user. In some embodiments, the display panel 60 can be a touch panel. However, the invention is not limited thereto. In some embodiments, the electronic device 1 can be an all-in-one PC. However, the invention is not limited thereto.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image building module comprising:
   an image builder including a first image capturing element and a processing chip, the first image capturing element used for capturing a first image, the processing chip used for processing the first image;
   a signal-shielding flexible film covering the processing chip; and
   a signal shielding cover covering the image builder and the signal-shielding flexible film, the signal shielding cover having a first through hole exposing the first image capturing element.

2. The image building module according to claim 1, wherein the image builder comprises a base, the processing chip is disposed at the base, and the signal-shielding flexible film surrounds the base and the processing chip.

3. The image building module according to claim 2, wherein the base comprises a circuit board module and a metal back plate, the processing chip is disposed at the circuit board module, the metal back plate has an inner surface and an outer surface opposite to each other, and the inner surface is adhered to the circuit board module.

4. The image building module according to claim 3, wherein the circuit board module has at least one grounding portion, and the grounding portion contacts the inner surface of the metal back plate.

5. The image building module according to claim 4, further comprising a grounding foil, wherein one part of the grounding foil is disposed at the outer surface of the metal back plate, and the other part of the grounding foil is separated from the image builder and the signal shielding cover.

6. The image building module according to claim 1, wherein the signal-shielding flexible film is adhered to the processing chip.

7. The image building module according to claim 6, wherein the signal-shielding flexible film comprises an adhesive film and a metal foil, the adhesive film has a first surface and a second surface, the first surface is adhered to the processing chip, and the metal foil is disposed at the second surface.

8. The image building module according to claim 1, wherein the signal shielding cover comprises a clamping groove, and the image builder is clamped in the clamping groove.

9. The image building module according to claim 8, wherein the signal shielding cover comprises a connecting plate and two side plates opposite to each other, the connecting plate is connected between the two side plates, the connecting plate and the two side plates define the clamping groove, the connecting plate covers the processing chip, and the first through hole is disposed at the connecting plate.

10. The image building module according to claim 1, wherein the image builder further comprises a second image capturing element, the first image capturing element and the second image capturing element are separated from each other, the signal shielding cover has a second through hole exposing the second image capturing element, the second image capturing element is used for capturing a second image, and the processing chip is used for building a stereoscopic image according to the first image and the second image.

11. The image building module according to claim 1, wherein signals of the processing chip conform to USB Revision 3.0 Specification.

12. An electronic device comprising:
    a substrate;

at least one antenna disposed at the substrate; and an image building module disposed at the substrate, wherein the image building module includes:
- an image builder including a first image capturing element and a processing chip, the first image capturing element used for capturing a first image, the processing chip used for processing the first image;
- a signal-shielding flexible film covering the processing chip; and
- a signal shielding cover covering the image builder and the signal-shielding flexible film, the signal shielding cover having a first through hole exposing the first image capturing element.

13. The electronic device according to claim 12, wherein the frequency range of signals of the antenna at least overlaps the frequency range of signals of the processing chip.

14. The electronic device according to claim 12, wherein the signals of the processing chip conform to USB Revision 3.0 Specification.

15. The electronic device according to claim 12, further comprising at least one conductive structure disposed between the antenna and the image building module.

16. The electronic device according to claim 12, wherein the image builder comprises a circuit board module and a metal back plate, the processing chip is disposed at the circuit board module, the metal back plate has an inner surface and an outer surface opposite to each other, the inner surface is adhered to the circuit board module, and the signal-shielding flexible film surrounds the processing chip and the metal back plate.

17. The electronic device according to claim 16, further comprising a grounding foil adhered to the outer surface of the metal back plate and the substrate, wherein the circuit board module has at least one grounding portion, and the grounding portion contacts the inner surface of the metal back plate.

18. The electronic device according to claim 16, wherein the signal-shielding flexible film comprises an adhesive film and a metal foil, the adhesive film has a first surface and a second surface, the first surface is adhered to the processing chip and the outer surface of the metal back plate, and the metal foil is disposed at the second surface.

19. The electronic device according to claim 13, wherein the signal shielding cover comprises a connecting plate and two side plates opposite to each other, the connecting plate and the two side plates define a clamping groove, the image builder is clamped in the clamping groove, the connecting plate covers the processing chip, and the first through hole is disposed at the connecting plate.

20. The electronic device according to claim 12, wherein the image builder further comprises a second image capturing element, the first image capturing element and the second image capturing element are separated from each other, the signal shielding cover has a second through hole exposing the second image capturing element, the second image capturing element is used for capturing a second image, and the processing chip is used for building a stereoscopic image according to the first image and the second image.

\* \* \* \* \*